Nov. 30, 1965 W. W. DIECK 3,220,131
MOUNTING OF FILM TRANSPARENCIES
Filed June 25, 1962 2 Sheets-Sheet 1

WILLIAM W. DIECK
INVENTOR.

BY
ATTORNEYS

United States Patent Office 3,220,131
Patented Nov. 30, 1965

3,220,131
MOUNTING OF FILM TRANSPARENCIES
William W. Dieck, Rochester, N.Y., assignor to Eastman Kodak Company, Rochester, N.Y., a corporation of New Jersey
Filed June 25, 1962, Ser. No. 205,026
7 Claims. (Cl. 40—152)

This invention relates to a photographic transparency slide mount and method of making same. More particularly, the invention relates to preventing the abrupt shifting of the plane of the film due to flexing of the film, while being projected. Such abrupt shifting or flexing, commonly known as "popping," frequently occurs when the film becomes heated during projection, and produces an objectionable and annoying defocusing of the projected image.

Generally, two somewhat related but separate physical characteristics of a film transparency determine the extent of the popping action thereof. These will be explained as now understood, but without any intention of limiting the scope of the invention in any manner by any theoretical aspects.

First, in the manufacture of film, a plurality of layers of gelatin emulsion may be coated on one side of a clear plastic support, such as cellulose acetate. The thickness of the gelatin layers and the inherent curl or curvature of the base determines the resulting curvature of the processed film.

Secondly, the emulsion side of the film will absorb moisture to a much greater degree than the support side of the film, such being conductive to linear expansion of the emulsion side of the film to a greater degree than the support side of the film. Thus, when the film is subject to an ambient atmosphere containing a high relative humidity, the film transparency will curl an additional amount in the same direction.

As a result, the finished film transparency is supplied to the consumer with an inherent curvature wherein the emulsion coated side is somewhat convex. A film transparency with such curvature is said to possess negative curl. It has been found that such film transparencies tend to abruptly shift or pop from a negative curl to a positive curl (emulsion-coated side concave) while being exhibited in a slide projector thereby producing the abovementioned objectionable defocusing effect. This is due in part, at least, to the fact that when the transparency is subjected to heat the moisture absorbed by the emulsion layer is evaporated, thus causing the emulsion layer to contract in its linear dimensions. However, because of the inherent curl characteristic of the film support, the support will resist the contracting action of the emulsion layer until a sufficient quantity of moisture is evaporated from the emulsion layer such that the stress generated in the emulsion layer will overcome the inherent curl of the support and "pop" the film transparency into a positive curl configuration.

I have found that this objectionable popping can be eliminated by forming the edges of the aperture of the transparency mount so that they will normally prestress the film so as to impart and maintain a positive curl in the mounted film transparency. Thus the transparency is, in effect, "prepopped" before it is subjected to the heat and consequent reduced relative humidity of the projector.

It is therefore, a principal object of the present invention to provide a method of mounting a film transparency with a curved shape imparted by the edges of the mount for the transparency.

Another object of the present invention is to provide a mounted film transparency which substantially eliminates "popping" of the film transparency when subjected to heat.

Other objects and a fuller understanding of the invention can be had by referring to the following description and claims taken in conjunction with the accompanying drawings, in which:

In order to facilitate the understanding of the invention, a brief summary will be helpful. As is usual with slide mounting, a film transparency is sandwiched between two halves or frames of a paperboard slide mount. Each frame of the slide mount has an aperture centrally located therein arranged so that, when assembled, the apertures are substantially in alignment with each other to frame the image area of the film transparency. In my improved mount, the lips or edge portions of the mount adjacent the apertures are so formed as to stress the transparency mounted therein so as to impart the desired compound curvature or positive curl thereto. While I have referred to a paperboard mount, it will be apparent that the invention is applicable also to mounts of other materials, e.g. plastic or metal.

Figure 1:
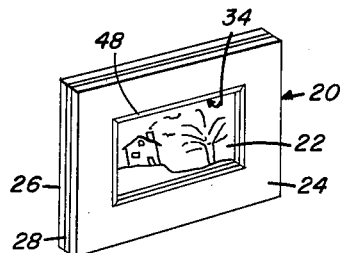
FIG. 1 is a perspective view of a mounted film transparency constructed in accordance with a preferred embodiment of the present invention.
Figure 2:
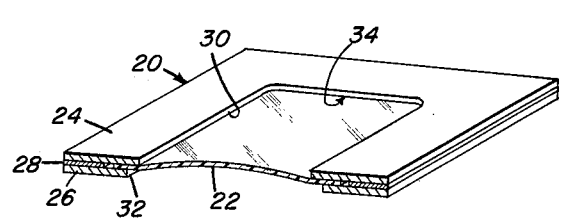
FIG. 2 is an enlarged perspective view, partly in section, of a mounted film transparency prior to its being prestressed in accordance with the present invention.

Referring more particularly to FIG. 2, there is illustrated a typical slide mount 20 which includes a film transparency 22 mounted intermediate the two paperboard frames 24 and 26 of the mount. A spacer 28, having a rectangular opening centrally disposed therein and of a size to accommodate film transparency 22 is interposed between the outer portion of frames 24 and 26 of mount 20. In the finished assembly, the frames and spacer are suitably sealed together to form a relatively rigid unitary support for the transparency.

Frames 24 and 26 of mount 20 have apertures 30 and 32, respectively, which apertures match to form the aperture 34 in the mount 20. Aperture 30 is preferably made slightly smaller than aperture 32 so that its edges clearly define a mask for the projected or viewed image area of film transparency 22. As previously described, when thus mounted, film transparency 22 has an objectionable tendency to flex or pop during its exhibition and this tendency can be minimized or eliminated by modifying the mount as described hereinbelow and as illustrated for example in FIGS. 3–10.

Figure 3:
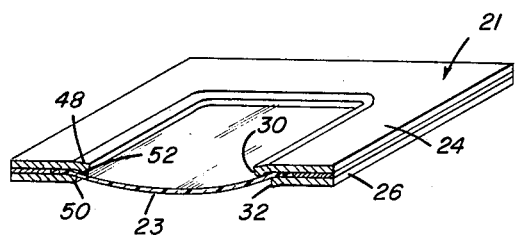
FIG. 3 is an enlarged perspective view, partly in section, of one embodiment of a mounted film transparency which has been prestressed in accordance with the present invention.

Thus, FIG. 3 shows a generally similar mount 21 according to the present invention wherein film transparency 23 has been prepopped. Film transparency 23 is held in the mount under stress such that it is forced to assume a downwardly bowed compound curvature (exaggerated for clarity in the drawing) with the emulsion coated side of the transparency concavely curved. The prepopped condition is accomplished as will now be described with particular reference to FIGS. 7 and 8.

Figure 7:
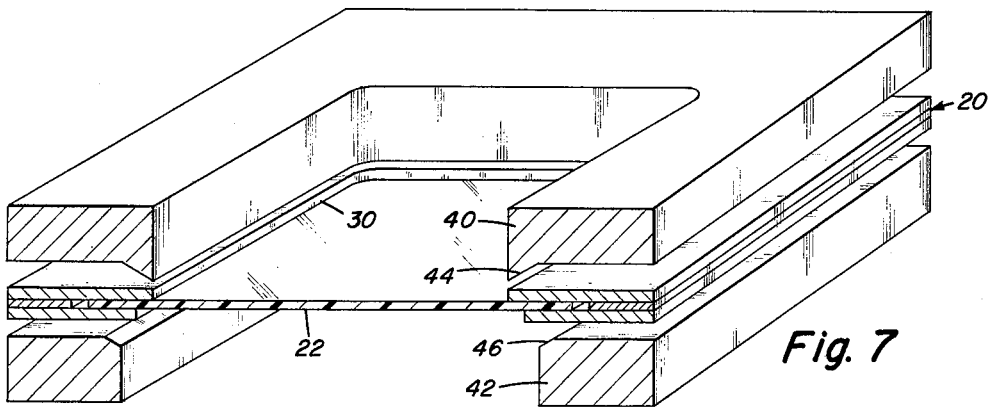
FIG. 7 is an enlarged perspective view, partly in section, showing one embodiment of forming jaws for use in making a mounted transparency in accordance with the present invention.
Figure 8:
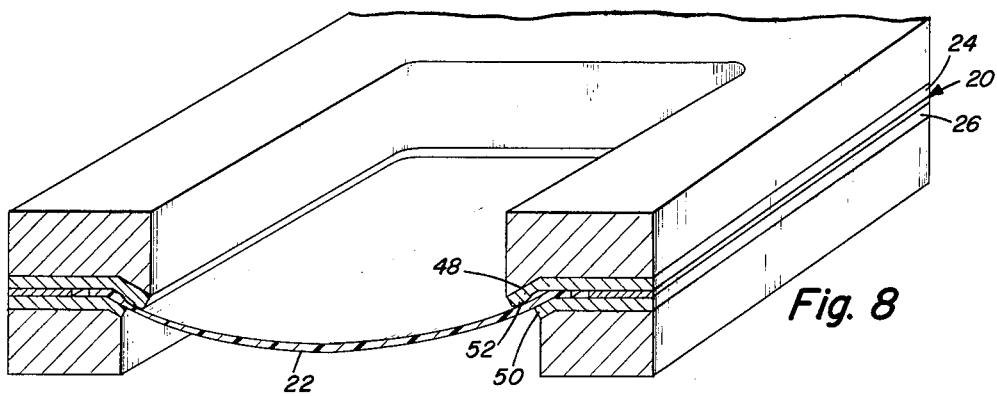
FIG. 8 is an enlarged perspective view, partly in section, showing the forming jaws of FIG. 7 in the closed position.

As best shown in FIG. 7, a conventional mount 20 having the film transparency 22 mounted therein, is placed between spaced co-operating forming jaws 40 and 42 preparatory to the popping operation. Jaws 40 and 42 are made of a material which is relatively unyielding as compared to the cardboard mount and are mounted on a suitable press mechanism, not shown, so that they can be closed under pressure on opposite sides of the transparency mount 20. A downwardly projecting pressure ridge or lip 44 is formed along the inner periphery of the lower surface of jaw 40 and defines an opening which is slightly larger than aperture 30 of mount 20. Similarly, the inner peripheral edge of jaw 42 is beveled to provide an inclined surface 46 having a downward slope substantially complementally located relative thereto. Hence, as best shown in FIG. 8, when the forming jaws 40 and 42 are closed on mount 20, the projecting pressure ridge 44 of forming jaw 40 co-operates with the beveled surface 46 to deform or bend downwardly the edge of mount 20 adjacent to the edge of aperture 30. Lips 48 and 50 are thus formed in mount 20 in the area adjacent aperture 30 and 32 when jaws 40 and 42 are moved toward each other. Further movement of jaws 40 and 42 results in lip 48 being compressed between the co-operating areas of ridge 44 and bevel edge 46 to bulge the outermost portion 52 of lip 48 against the edge of transparency 22 due to the downward and outward escape of the mount materials from between ridge 44 and edge 46. It will further be noted that lip 48 of frame 24 is so formed that it protrudes or bulges somewhat below (as shown in FIG. 8) the normal plane of frame 24 and in bearing against the marginal portion of the transparency thus forces the transparency into the stressed, positively curled configuration shown. As in any forming operation some of the material in the cardboard mount will actually be permanently displaced with respect to adjacent material so that the lip portions 48 and 50 will retain their formed position including the bulge of outermost portion 52 even after the forming dies are opened and will continue to hold the transparency in the stressed or prepopped condition. When thus shaped, the film transparency 23 has been found to resist further changes due to any combination of heat or moisture, and thus the tendency for the film transparency to pop is eliminated.

Figure 4:
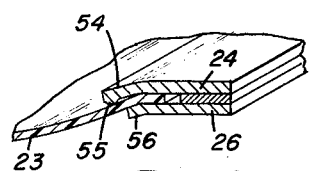
FIG. 4 is an enlarged perspective view, partly in section, of a portion of the edge of the aperture of a second embodiment of a mounted film transparency made in accordance with the present invention.

While the method and apparatus described hereinabove involve the use of forming jaws in which the edges of the apertures are displaced in planes distinct from the plane of the mount, it is obvious that a substantially curved configuration could be given to the forming jaws such that the lips 54 and 56 adjacent to the edges of the apertures of each of frames 24 and 26 are deformed downwardly in a substantially smooth curved configuration, as shown in FIG. 4. The outermost portion 55 of lip 54 will also be bulged in a manner similar to lip 48 of FIG. 3.

Figure 5:
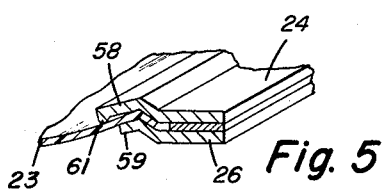
FIG. 5 is an enlarged perspective view, partly in section, of a portion of the edge of the aperture of another embodiment of a mounted film transparency made in accordance with the present invention.

Still another embodiment, as shown in FIG. 5, illustrates a slide mount which has been prepopped in a manner such that the upper and lower edges or lips 58 and 59, respectively, of frames 24 and 26 are provided with a reverse bend to impress a compound curvature onto a film transparency 23. The outermost portion 61 of lip 58 will also be bulged in a manner similar to lip 48 of FIG. 3.

It is to be further understood that the above-described method which was disclosed with particular reference to a film transparency which has previously been mounted in a slide can obviously also be preformed simultaneously with the mounting of a film transparency 22 in mount 20.

Figure 6:
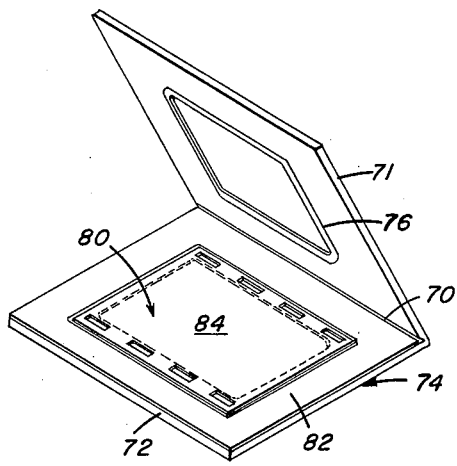
FIG. 6 is an enlarged perspective view of a foldable preformed transparency mount in a partly closed position, and with a film transparency located therein.
Figure 9:
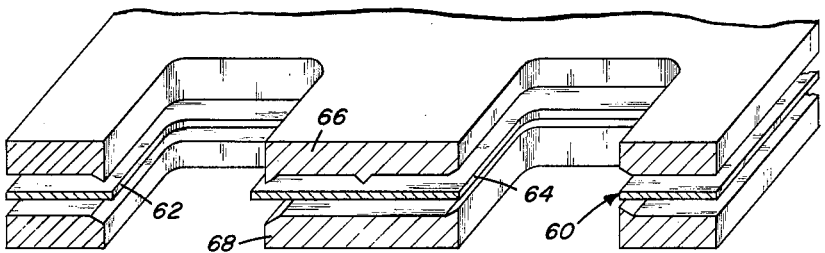
FIG. 9 is an enlarged perspective view, partly in section, showing another embodiment of forming apparatus for use in preparing transparency mounts in accordance with my invention.
Figure 10:
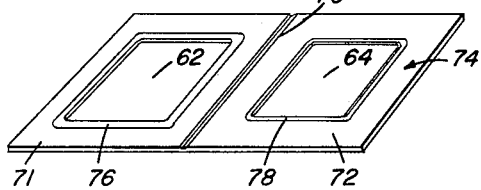
FIG. 10 is a perspective view of a transparency mount formed by use of the apparatus shown in FIG. 9.

Still another embodiment of this invention is shown in FIGS. 6, 9 and 10, wherein flat cardboard paper stock 60, having two apertures 62 and 64 located therein, is positioned intermediate a pair of spaced forming jaws 66 and 68 such that when the forming jaws are moved together a crease or fold line 70 is scored in the cardboard stock which crease is equidistant from the parallel center lines (not shown) of apertures 62 and 64, to thus effectively form a pair of frames 71 and 72. Simultaneously the forming jaws deform or bend the edges of the two apertures in respectively opposite directions. Thus, as shown in FIG. 10, a foldable cardboard paper mount 74 is formed having suitable apertures 62 and 64 located therein and deformed lips or edges 76 and 78 adjacent the apertures for the purpose of bowing the film transparency when the two mount halves are folded together with the transparency therebetween. If desired, the deformation of the edges of apertures 62 and 64 can be accomplished simultaneously with the cutting or punching of these apertures.

Mounting is carried out by placing film transparency 80 in a suitable spacer 82, which has previously been secured to the inner space of frame 72, as by a suitable adhesive, so that the image area 84 of transparency 80 is in registry with aperture 64 in frame 72. Frame 71 of mount 74 is folded over along fold line 70 as in FIG. 6 until it engages spacer 82 to which it is then adhered. The curved edge or lip 76 presses against the edge of film transparency 80, and in cooperation with curved edge or lip 78 causes the marginal portions of the film transparency 80 to be displaced from their normal configuration into the curved configuration shown in FIG. 3. Hence, the co-operating lips formed on the edges of each of the apertures will cause the film transparency 80 to assume a compound curvature in which the transparency has a positive curl, such as was described above relative to FIGS. 1–5.

It will be seen that the invention embodied in the above-described method and means provides an improved mount in which at least one of the halves of the mount has a raised lip comprising a bulge of material adjacent the edge of the aperture therein to contact a transparency and bent it at an angle to the plane of the slide mount whereby the portion of the transparency within the aperture assumes a curved shape so that popping does not occur during the exhibition of the slide. Since the curvature is formed by engagement of the mount with the edge of the transparency, the method involves no danger of injury to the picture-bearing portion of the transparency.

The invention has been described in detail with particular reference to preferred embodiments thereof, but it will be understood that variations and modifications can be effected within the spirit and scope of the invention as described hereinabove and as defined in the appended claims.

I claim:

1. In the method of making a photographic product of the type comprising cooperating halves of an apertured mount and a film transparency carried by said mount between said cooperating halves and spanning said aperture, the improvement which comprises:
   (a) deforming the material of both peripheral, marginal edges adjacent the aperture of the cooperating halves of the mount in the same direction out of their normal plane to impart a curvature to said transparency.

2. The method of forming a curvature in a film transparency mounted with its marginal portions between cooperating halves of an apertured mounting frame which comprises the steps of:
 (a) positioning those portions of one of the halves of the mounting frame located outwardly of an intermediate portion of the marginal portions of said film transparency on a relatively unyielding surface; and
 (b) deforming those portions of the mounting frame engaging said marginal portion of said film transparency toward said unyielding surface in a direction substantially transverse to the plane of said mounting frame to impart a curvature in that portion of the film transparency bounded by the aperture of the mounting frame.

3. A method of forming a curvature in a film transparency mounted at its marginal portions between cooperating halves of an apertured mounting frame which comprises the steps of:
 (a) positioning those portions of one of the halves of the mounting frame located outwardly of the marginal portions of said film transparency on a relatively unyielding surface;
 (b) stressing the mounting frame on said unyielding surface; and
 (c) simultaneously deforming said portions of each half of the mounting frame engaging the marginal portion of said film transparency toward the unyielding surface in a direction substantially transverse to the plane of said mounting frame to form a curvature in that portion of the film transparency bounded by the apertures of said halves of said mounting frame.

4. The method of forming a prestressed mounted film transparency of the type wherein the transparency includes an image area bounded by a marginal portion and is mounted between the cooperating halves of an apertured mounting frame, which comprises the steps of:
 (a) deforming from their normal plane those portions of each half of the mounting frame lying adjacent the edges of the aperture, prior to mounting the transparency;
 (b) inserting the film transparency intermediate the cooperating halves of said mounting frame complementally arranged with respect to one another, with the image area of said film transparency in registry with the apertures thereof and the marginal portion of said transparency contacting the deformed edge portions of at least one of said halves;
 (c) applying pressure to force cooperating halves of the apertured mounting frame together with said marginal portion of the transparency interposed therebetween whereby a curvature is imparted to the image area of the transparency by said deformed portions; and
 (d) securing said halves together while maintaining such pressure.

5. In a film transparency mount the combination comprising:
 (a) a pair of spaced apertured members arranged in overlying relation with their apertures substantially in registry;
 (b) a film transparency including an image area bounded by marginal surfaces located with said image area substantially in registry with said apertures and with said marginal surfaces positioned between said spaced members; and
 (c) edge portions adjacent to each aperture being deformed in the same direction from the flat plane of each spaced apertured member for imparting a curvature to said image area of the transparency when said marginal surfaces of said transparency are confined between said spaced apertured members, whereby popping of the film transparency is eliminated.

6. The film transparency mount of claim 5 in which said edge portions are angularly inclined in the same direction from the general plane of said spaced members.

7. The film transparency mount of claim 5 in which said edge portions adjacent each aperture of each spaced apertured mount are angularly offset in the same direction into a plurality of duplicate planes from the flat plane of each spaced member.

References Cited by the Examiner
UNITED STATES PATENTS

| 2,863,244 | 12/1958 | Lyon | 40—152 |
| 2,968,108 | 1/1961 | Knox | 40—152 |
| 3,013,354 | 12/1961 | Wilkund | 40—152 |

EUGENE R. CAPOZIO, *Primary Examiner.*

E. V. BENHAM, JEROME SCHNALL, *Examiners.*